US012783835B2

(12) United States Patent
Takita

(10) Patent No.: US 12,783,835 B2
(45) Date of Patent: Nov. 3, 2026

(54) CARD READER

(71) Applicant: NIDEC INSTRUMENTS CORPORATION, Nagano (JP)

(72) Inventor: Yukihiko Takita, Nagano (JP)

(73) Assignee: NIDEC INSTRUMENTS CORPORATION, Nagano (JP)

( * ) Notice: Subject to any disclaimer, the term of this patent is extended or adjusted under 35 U.S.C. 154(b) by 0 days.

(21) Appl. No.: 19/211,281

(22) Filed: May 19, 2025

(65) Prior Publication Data

US 2025/0356152 A1 Nov. 20, 2025

(30) Foreign Application Priority Data

May 20, 2024 (JP) ................................ 2024-081544

(51) Int. Cl.
*G06K 13/08* (2006.01)
*G06K 7/00* (2006.01)

(52) U.S. Cl.
CPC ....... *G06K 13/0881* (2013.01); *G06K 7/0021* (2013.01)

(58) Field of Classification Search
CPC .. G06K 13/08; G06K 13/0881; G06K 7/0021; G06K 7/0082; G06K 7/0085
USPC ................................................ 235/439, 449
See application file for complete search history.

(56) References Cited

U.S. PATENT DOCUMENTS 6,164,538 A * 12/2000 Furuya .................. G06K 7/084 235/449
2014/0008438 A1* 1/2014 Kitazawa ............... G06K 7/082 235/449

FOREIGN PATENT DOCUMENTS

JP 2005-107582 A 4/2005

* cited by examiner

*Primary Examiner* — Laura A Gudorf
(74) *Attorney, Agent, or Firm* — HAUPTMAN HAM, LLP

(57) ABSTRACT

A card reader for processing a card having an external connection terminal of an IC chip includes a card insertion slot, a card conveyance path in which the card inserted from the card insertion slot is conveyed, a card conveyance mechanism structured to convey the card along the card conveyance path, and a metal detecting mechanism for detecting the external connection terminal. The card conveyance mechanism includes one or more conveyance roller pairs which contact with the card and convey the card in a sandwiching state and, when the conveyance roller pair disposed on the most front side, i.e., the card insertion slot side, is referred to as a first conveyance roller pair, the metal detecting mechanism is disposed on a rear side with respect to the external connection terminal of the card when a rear end of the card is sandwiched between the first conveyance roller pair.

5 Claims, 4 Drawing Sheets

CARD READER

CROSS REFERENCE TO RELATED APPLICATION

The present invention claims priority under 35 U.S.C. § 119 to Japanese Application No. 2024-081544 filed May 20, 2024, the entire content of which is incorporated herein by reference.

TECHNICAL FIELD

At least an embodiment of the present invention may relate to a card reader.

BACKGROUND

Conventionally, an IC card processing device for processing a contact-type IC card has been known (see, for example, Japanese Patent Laid-Open No. 2005-107582 (Patent Literature 1). An IC chip is embedded in an IC card which is processed in an IC card processing device described in Patent Literature 1. An external connection terminal (IC contact) of the IC chip is provided on a surface of the IC card. An IC card except the IC chip and the external connection terminal is formed of resin. The IC card processing device described in Patent Literature 1 is provided with an IC contact detection sensor for detecting presence or absence of the external connection terminal of the IC card.

In the IC card processing device described in Patent Literature 1, the IC contact detection sensor is disposed in a passage near an insertion slot for an IC card. The IC contact detection sensor is structured of a frequency oscillation type proximity sensor and, even when a non-magnetic body such as resin is moved to a position just under the IC contact detection sensor, an output of the IC contact detection sensor is not varied. However, when a magnetic body such as metal is moved to a position just under the IC contact detection sensor, an output of the IC contact detection sensor is varied. Therefore, in the IC card processing device described in Patent Literature 1, presence or absence of an external connection terminal of an IC card can be detected in the vicinity of an insertion slot for an IC card by the IC contact detection sensor.

An IC card includes, in addition to a card in which resin is used as base material of the card, a card (metal card) in which metal is used as base material of the card. Even in a case that a metal card is processed in the IC card processing device described in Patent Literature 1, an output of the IC contact detection sensor is varied between a portion of an IC card where an external connection terminal is formed and other portion of the IC card and thus, presence or absence of the external connection terminal of the IC card can be detected by the IC contact detection sensor.

However, in the IC card processing device described in Patent Literature 1, the IC contact detection sensor is disposed in the vicinity of an insertion slot for an IC card. Therefore, for example, when a user of the IC card processing device is going to manually insert an IC card into the insertion slot, a distance between the IC contact detection sensor and the IC card may be varied due to a shake (hand shake) of the card. In a case that a metal card is processed in the IC card processing device described in Patent Literature 1, when a distance between the IC contact detection sensor and the IC card is varied due to a hand shake or the like at a time of insertion of the IC card, an output of the IC contact detection sensor is varied and thus, even if an external connection terminal is not formed in the IC card, the output of the IC contact detection sensor may be varied and therefore, the IC contact detection sensor erroneously detects an external connection terminal of the IC card. In other words, in a case that a metal card is processed in the IC card processing device described in Patent Literature 1, accuracy of detecting presence or absence of an external connection terminal of an IC card may be decreased.

SUMMARY

In view of the problem described above, at least an embodiment of the present invention may advantageously provide a card reader for processing a card which incorporates an IC chip and is formed with an external connection terminal of the IC chip. The card reader is capable of suppressing deterioration of accuracy for detecting whether or not a card inserted from a card insertion slot is formed with an external connection terminal even when a metal card in which metal is used as base material of the card is processed.

According to at least an embodiment of the present invention, there may be provided a card reader for processing a card which incorporates an IC chip and is formed with an external connection terminal of the IC chip. The card reader includes a card insertion slot into which the card is inserted, a card conveyance path in which the card inserted from the card insertion slot is conveyed, a card conveyance mechanism structured to convey the card along the card conveyance path, and a metal detecting mechanism for detecting the external connection terminal. When one side in a conveying direction of the card by the card conveyance mechanism is referred to as a front side and, when the other side in the conveying direction of the card by the card conveyance mechanism is referred to as a rear side, a front side end of the card conveyance path is formed with the card insertion slot. The card conveyance mechanism includes one or more conveyance roller pairs which contact with the card and conveys the card in a sandwiching state. In a case that the card conveyance mechanism includes a plurality of the conveyance roller pairs, the conveyance roller pair which is disposed on the most front side is referred to as a first conveyance roller pair and, in a case that the card conveyance mechanism includes only one conveyance roller pair, the one conveyance roller pair is referred to as a first conveyance roller pair, the metal detecting mechanism is disposed on a rear side with respect to the external connection terminal of the card when a rear end of the card is sandwiched between the first conveyance roller pair.

In the card reader in this embodiment, the metal detecting mechanism is disposed on a rear side with respect to an external connection terminal of a card when a rear end of the card is sandwiched between the first conveyance roller pair. Therefore, in this embodiment, when the card is moved along the card conveyance path toward a rear side, after a rear end of the card is sandwiched between the first conveyance roller pair, the external connection terminal reaches a position where the metal detecting mechanism is disposed in the conveying direction of the card. In other words, in this embodiment, when the external connection terminal passes the position where the metal detecting mechanism is disposed in the conveying direction of the card, at least a rear side portion of the card is sandwiched between the first conveyance roller pair.

Therefore, according to this embodiment, even if a shake (hand shake) of a card occurs when a user manually inserts the card into the card insertion slot, when the external connection terminal passes the position where the metal detecting mechanism is disposed in the conveying direction of the card, variation of a distance between the external connection terminal and the metal detecting mechanism can be suppressed by the first conveyance roller pair. Accordingly, in this embodiment, in a case that a metal card in which metal is used as base material of the card is processed in the card reader, variation of an output of the metal detecting mechanism due to variation of a distance between the external connection terminal and the metal detecting mechanism can be suppressed. As a result, even when a metal card is processed in the card reader, deterioration of accuracy for detecting whether or not the card inserted from the card insertion slot is formed with an external connection terminal can be suppressed.

Effects of the Invention

As described above, according to an embodiment of the invention, in a card reader for processing a card which incorporates an IC chip and is formed with an external connection terminal of the IC chip, even when a metal card in which metal is used as base material of the card is processed, deterioration of accuracy for detecting whether the card inserted from the card insertion slot is formed with the external connection terminal or not can be suppressed.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

An embodiment of the present invention will be described below with reference to the accompanying drawings.

(Structure of Card Reader)

Figure 1:
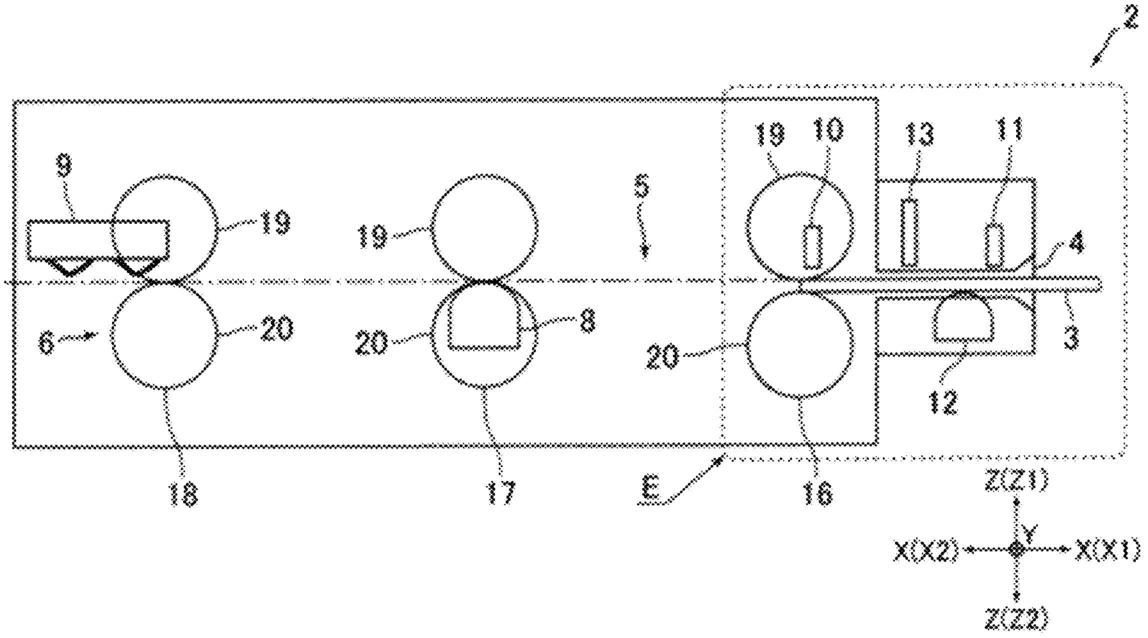
FIG. 1 is an explanatory schematic side view showing a structure of a card reader in accordance with an embodiment of the present invention.
Figure 2:
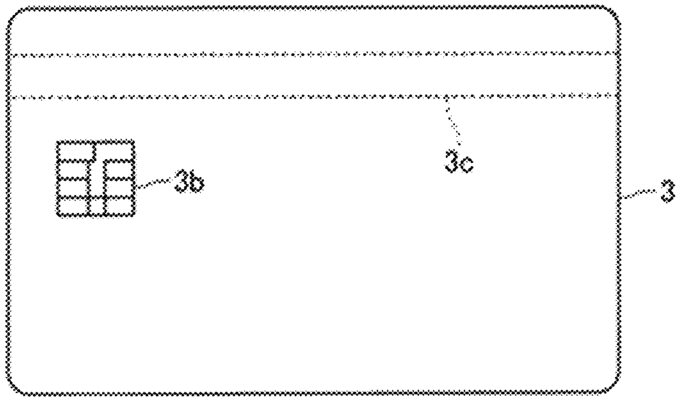
FIG. 2 is a plan view showing a card shown in FIG. 1.
Figure 3:
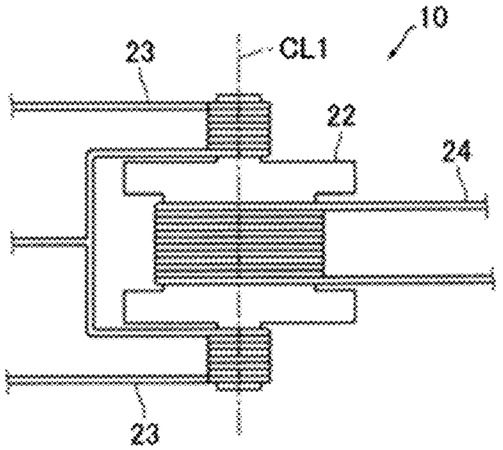
FIG. 3 is an explanatory view showing a structure of a metal detection mechanism shown in FIG. 1.
Figure 4A:
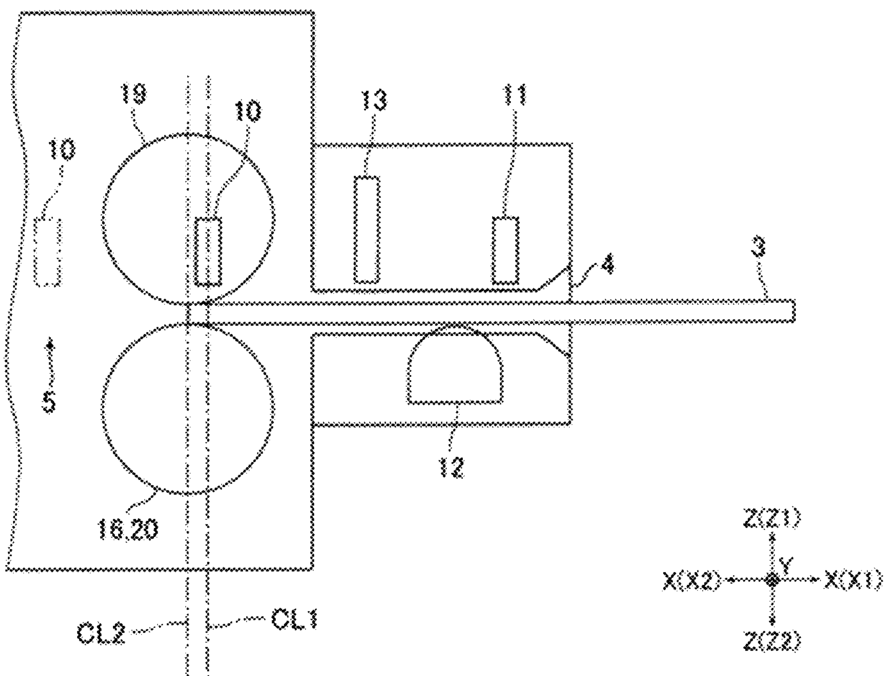
FIG. 4A is an enlarged view showing the "E"-part in FIG. 1.
Figure 4B:
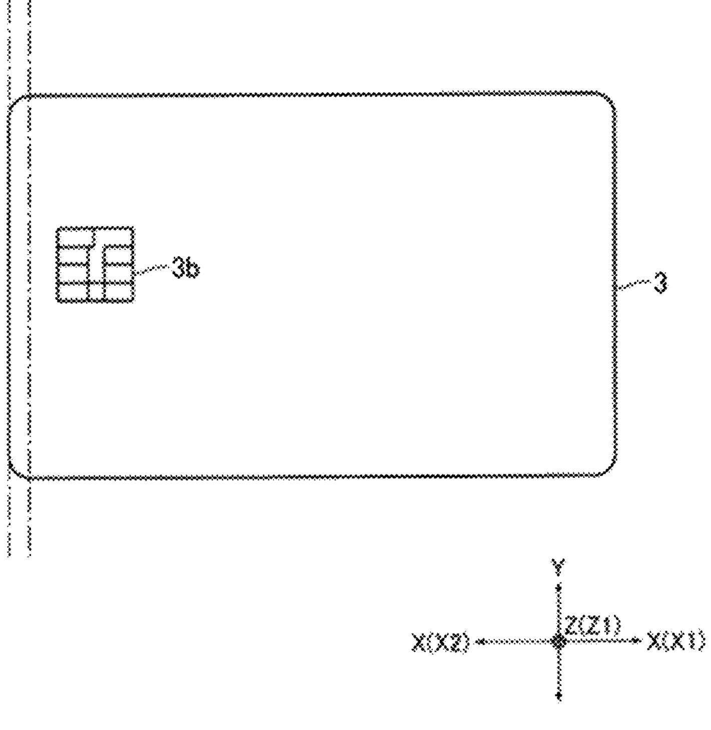
FIG. 4B is a plan view showing a card in FIG. 4A.
Figure 5A:
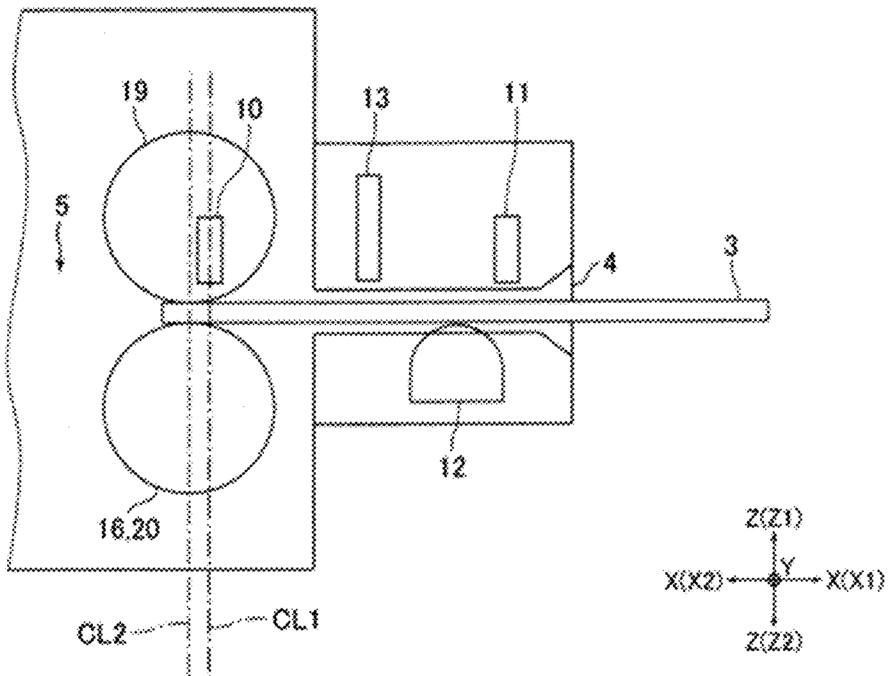
FIG. 5A is an enlarged view showing the "E"-part in FIG. 1.
Figure 5B:
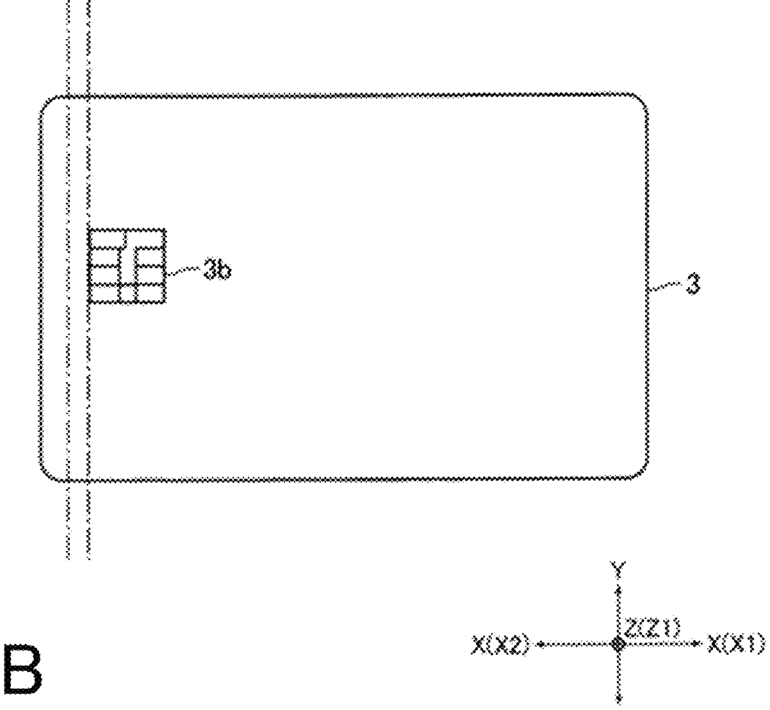
FIG. 5B is a plan view showing a card in FIG. 5A.

FIG. 1 is an explanatory schematic side view showing a structure of a card reader 2 in accordance with an embodiment of the present invention. FIG. 2 is a plan view showing a card 3 in FIG. 1. FIG. 3 is an explanatory view showing a structure of a metal detection mechanism 10 shown in FIG. 1. FIG. 4A is an enlarged view showing the "E"-part in FIG. 1, and FIG. 4B is a plan view showing a card 3 in FIG. 4A. FIG. 5A is an enlarged view showing the "E"-part in FIG. 1, and FIG. 5B is a plan view showing a card 3 in FIG. 5A.

A card reader 2 in this embodiment is a device for processing a card 3. Specifically, the card reader 2 is a device for reading data recorded in a card 3 and/or recording data to the card 3. The card reader 2 is, for example, mounted and used in a predetermined host apparatuses such as an ATM (Automatic Teller Machine).

A card 3 is formed in a flat plate shape which is a thin rectangular shape whose thickness is about 0.7-0.8 mm. The card 3 is a plastic card (resin card) in which resin such as vinyl chloride is used as base material, or a metal card in which metal is used as base material. The card 3 is a card in conformity with the international standard and the JIS standard. The card 3 has a built-in IC chip, and one face (specifically, a front face) of the card 3 is formed with an external connection terminal 3*b* of the IC chip. The external connection terminal 3*b* is disposed at a position specified in the international standard and the JIS standard. When the card 3 is a plastic card, a magnetic stripe 3*c* may be formed on the card 3.

The card reader 2 is formed with a card insertion slot 4 into which a card 3 is inserted. Further, an inside of the card reader 2 is formed with a card conveyance path 5 where the card 3 inserted from the card insertion slot 4 is conveyed. The card reader 2 includes a card conveyance mechanism 6 which conveys a card 3 along the card conveyance path 5. In other words, the card reader 2 is a card conveyance-type card reader. Further, the card reader 2 includes a magnetic head 8 for performing at least one of reading of magnetic data recorded in a card 3 and recording of magnetic data to the card 3, and an IC contact block 9 for communicating data with a built-in IC chip of the card 3.

In this embodiment, a card 3 is conveyed in the card conveyance path 5 in the X-direction shown in FIG. 1 and the like. In other words, the X-direction is a conveying direction of a card 3 by the card conveyance mechanism 6. Further, the Z-direction perpendicular to the X-direction is a thickness direction of a card 3 which is conveyed in the card conveyance path 5, and the Y-direction perpendicular to the X-direction and the Z-direction is a width direction (short width direction) of the card 3 which is conveyed in the card conveyance path 5. The card reader 2 is, for example, disposed so that the Z-direction and a vertical direction are coincided with each other.

In the following descriptions, the X-direction is a front-rear direction, and the Z-direction is an upper-lower direction. Further, in the following descriptions, the X1-direction side in FIG. 1 and the like which is one side in the front-rear direction is referred to as a "front" side, and the X2-direction side in FIG. 1 and the like which is the other side in the front-rear direction is referred to as a "back" side or a "rear" side. Further, the Z1-direction side in FIG. 1 and the like which is one side in the upper-lower direction is referred to as an "upper" side, and the Z2-direction side in FIG. 1 and the like which is the other side is referred to as a "lower" side.

In the card reader 2, a card 3 is inserted toward a rear side, and the card 3 is ejected toward a front side. A front end of the card conveyance path 5 is formed with a card insertion slot 4. In the card conveyance path 5, a card 3 is conveyed so that a longitudinal direction of the card 3 formed in a rectangular shape and the front-rear direction are coincided with each other. Further, when the card 3 is inserted into the card insertion slot 4 in a correct direction, a front face of the card 3 (in other words, a face on which an external connection terminal 3*b* is formed) faces an upper side in the card conveyance path 5, and the external connection terminal 3*b* is disposed on a rear end side of the card 3.

The card reader 2 includes, in addition to the card conveyance mechanism 6 and the like, two metal detection mechanisms 10 and 11 for detecting the external connection terminal 3*b* of the card 3, a pre-head (magnetic head) 12 for detecting magnetic data recorded on the card 3, and a shutter member 13 for closing the card conveyance path 5. Further, the card reader 2 includes an insertion detection mechanism for detecting insertion of a card 3 into the card insertion slot 4. The insertion detection mechanism is, for example, a width detection mechanism which detects an end part of a card 3 in the width direction of the card 3 and thereby detects that the card 3 has been inserted into the card insertion slot 4.

The card conveyance mechanism 6 includes a plurality of conveyance roller pairs 16 through 18, which are structured to contact with a card 3 to convey the card 3 in a state that the card 3 is sandwiched therebetween. For example, the card conveyance mechanism 6 includes three conveyance roller pairs 16 through 18. Each of the conveyance roller pairs 16 through 18 is structured of a drive roller 19 and a pad roller 20 disposed so as to face the drive roller 19. The drive roller 19 is connected with a motor through a predetermined power transmission mechanism. The pad roller 20 is urged toward the drive roller 19. The drive roller 19 and the pad roller 20 face each other in the upper-lower direction. A card 3 is conveyed in a sandwiched state between the drive roller 19 and the pad roller 20.

The conveyance roller pairs 16 through 18 are disposed in this order from a front side toward a rear side. In other words, the conveyance roller pair 16 is disposed on the most front side among the three conveyance roller pairs 16 through 18. Distances between the conveyance roller pairs 16 through 18 are set to be slightly shorter than a length in the longitudinal direction of a card 3 which is formed in a rectangular shape. In this embodiment, as shown in FIG. 4A, when a rear end of a card 3 is sandwiched between the conveyance roller pair 16, a portion more than a half of the card 3 in the front-rear direction is disposed on a rear side with respect to the card insertion slot 4. The conveyance roller pair 16 in this embodiment is a first conveyance roller pair.

A magnetic head 8 is, for example, disposed at the same position as the conveyance roller pair 17 in the front-rear direction. The magnetic head 8 is disposed so as to face the card conveyance path 5 from a lower side. An IC contact block 9 is, for example, disposed on a rear end side of the card reader 2. The IC contact block 9 is provided with a plurality of IC contact springs structured to contact with an external connection terminal 3*b* of a card 3 and perform communication of data. The IC contact block 9 is disposed so as to face the card conveyance path 5 from an upper side. The card reader 2 includes a block moving mechanism which moves the IC contact block 9 between a position where the IC contact springs are capable of contacting with an external connection terminal 3*b* and a position where the IC contact springs are unable to contact with the external connection terminal 3*b*.

The shutter member 13 is movable between a closing position where the card conveyance path 5 is closed and an open position where the card conveyance path 5 is opened. The card reader 2 includes a shutter drive mechanism structured to move the shutter member 13 between the closing position and the open position. The shutter member 13 is disposed on a front side with respect to the conveyance roller pair 16. The pre-head 12 is disposed so as to face the conveyance path 5 from a lower side. The pre-head 12 is disposed on a front side with respect to the shutter member 13. The pre-head 12 functions as detecting that magnetic data are recorded on a card 3 which is inserted into the card insertion slot 4.

A metal detecting mechanism 10 is a differential type magnetic sensor. The metal detecting mechanism 10 includes, as shown in FIG. 3, a core 22 formed of magnetic material, and a pair of excitation coils 23 and a detection coil 24 which are wound around the core 22. The detection coil 24 is wound around at a center of the core 22 in an axial direction of an axial center "CL1" of the core 22. Each of a pair of the excitation coils 23 is wound around each of both end sides of the core 22 in the axial direction of the axial center "CL1". The metal detecting mechanism 10 is structured so that the detection coil 24 detects variation of the magnetic field generated by the excitation coils 23 and thereby, metal such as an external connection terminal 3*b* of a card 3 and the like is detected. The metal detecting mechanism 10 is disposed so as to face the card conveyance path 5 from an upper side.

The metal detecting mechanism 10 is disposed on a rear side with respect to the shutter member 13. Further, the metal detecting mechanism 10 is disposed on a front side with respect to a center "CL2" of the conveyance roller pair 16 in the front-rear direction. In addition, when a rear end of a card 3 formed with an external connection terminal 3*b* is sandwiched between the conveyance roller pair 16, the metal detecting mechanism 10 is disposed on a rear side with respect to the external connection terminal 3*b* of the card 3. Specifically, when a rear end of a card 3 which is formed with an external connection terminal 3*b* and is inserted into the card insertion slot 4 in a correct direction is sandwiched between the conveyance roller pair 16, the metal detecting mechanism 10 is disposed on a rear side with respect to the external connection terminal 3*b* (see FIGS. 4A and 4B).

In other words, the metal detecting mechanism 10 is disposed at a position so that the external connection terminal 3*b* is passed after a card 3 formed with the external connection terminal 3*b* and inserted into the card insertion slot 4 in a correct direction is moved along the card conveyance path 5 toward a rear side and a rear end of the card 3 is sandwiched between the conveyance roller pair 16. In other words, when a card 3 which is formed with an external connection terminal 3*b* and is inserted into the card insertion slot 4 in a correct direction is moved along the card conveyance path 5 toward a rear side, after a rear end of the card 3 is sandwiched between the conveyance roller pair 16, the external connection terminal 3*b* reaches a position where the metal detecting mechanism 10 is disposed in the front-rear direction (see FIGS. 5A and 5B).

A metal detecting mechanism 11 is similarly structured to the metal detecting mechanism 10. In other words, the metal detecting mechanism 11 is a differential type magnetic sensor and includes a core 22, a pair of excitation coils 23 and a detection coil 24. The metal detecting mechanism 11 is disposed on a front side with respect to the shutter member 13. Further, the metal detecting mechanism 11 is disposed on a front side with respect to the pre-head 12. The metal detecting mechanism 11 is disposed so as to face the card conveyance path 5 from an upper side. The metal detecting mechanism 10 and the metal detecting mechanism 11 are disposed at the same position as each other in the upper-lower direction. The metal detecting mechanism 11 in this embodiment is a second metal detecting mechanism.

When a rear end of a card 3 formed with an external connection terminal 3*b* and inserted into the card insertion slot 4 in a correct direction reaches a position where the shutter member 13 is disposed in the front-rear direction, the metal detecting mechanism 11 is disposed on a front side with respect to a rear end of the external connection terminal 3*b*. In other words, when a card 3 which is formed with an external connection terminal 3*b* and is inserted into the card insertion slot 4 in a correct direction is moved along the card conveyance path 5 toward a rear side, a rear end of the external connection terminal 3*b* passes through a position where the metal detecting mechanism 11 is disposed in the front-rear direction before a rear end of the card 3 reaches a position where the shutter member 13 is disposed in the front-rear direction.

In this embodiment, in a standby state before a card 3 is inserted into the card reader 2, the shutter member 13 is disposed at the closing position and closes the card conveyance path 5. On the other hand, for example, when it is detected that a card 3 is inserted into the card insertion slot 4 and, in addition, when the pre-head 12 detects that magnetic data are recorded on the card 3, the shutter member 13 is moved from the closing position to the open position and opens the card conveyance path 5. When the card conveyance path 5 is opened, the card 3 is capable of being taken into an inside of the card reader 2.

Further, for example, it is detected that a card 3 is inserted into card the insertion slot 4 and, when metal is detected by the metal detecting mechanism 11, the shutter member 13 is moved from the closing position to the open position and opens the card conveyance path 5. In other words, in a case that a card 3 inserted into the card insertion slot 4 is a metal card and, in a case that a card 3 inserted into the card insertion slot 4 is a plastic card, the card 3 is formed with an external connection terminal 3*b* and, in addition, when the card 3 is inserted into the card insertion slot 4 in a correct direction, metal is detected by the metal detecting mechanism 11 and thus, the shutter member 13 is moved from the closing position to the open position and opens the card conveyance path 5.

When the card 3 is moved from the shutter member 13 toward a rear side, the card 3 passes a position where the metal detecting mechanism 10 is disposed. In a case that a card 3 inserted into the card insertion slot 4 is a metal card and the card 3 is not formed with an external connection terminal 3*b* and, in a case that a card 3 is a metal card and, although the card 3 is formed with an external connection terminal 3*b*, a front face of the card 3 faces a lower side, an output of the metal detecting mechanism 10 varies when a rear end of the card 3 reaches a position where the metal detecting mechanism 10 is disposed but, after that, the output of the metal detecting mechanism 10 hardly varies until a front end of the card 3 passes through the metal detecting mechanism 10.

On the other hand, the card 3 inserted into the card insertion slot 4 is a metal card and, in a case that the card 3 is formed with an external connection terminal 3*b* and a front face of the card 3 faces an upper side, when a rear end of the card 3 reaches the position where the metal detecting mechanism 10 is disposed, an output of the metal detecting mechanism 10 varies and, in addition, when the external connection terminal 3*b* reaches the position where the metal detecting mechanism 10 is disposed, the output of the metal detecting mechanism 10 varies again. Therefore, in this embodiment, even when a card 3 is a metal card, based on detection results of the metal detecting mechanism 10, it can be detected that a front face of a card 3 formed with an external connection terminal 3*b* faces an upper side.

(Principal Effects in this Embodiment)

As described above, in this embodiment, when a rear end of a card 3 formed with an external connection terminal 3*b* is sandwiched between the conveyance roller pair 16 which is disposed on the most front side, the metal detecting mechanism 10 is disposed on a rear side with respect to the external connection terminal 3*b*. Further, when the card 3 formed with the external connection terminal 3*b* and inserted into the card insertion slot 4 in a correct direction is moved along the card conveyance path 5 toward a rear side, after a rear end of the card 3 is sandwiched between the conveyance roller pair 16, the external connection terminal 3*b* reaches the position where the metal detecting mechanism 10 is disposed in the front-rear direction.

In other words, in this embodiment, when the external connection terminal 3*b* passes the position where the metal detecting mechanism 10 is disposed in the front-rear direction, at least a rear side portion of the card 3 is sandwiched between the conveyance roller pair 16. Therefore, according to this embodiment, even if a shake (hand shake) of a card 3 occurs when a user manually inserts the card 3 into the card insertion slot 4, in a case that the external connection terminal 3*b* passes the position where the metal detecting mechanism 10 is disposed in the front-rear direction, variation of a distance between the external connection terminal 3*b* and the metal detecting mechanism 10 can be suppressed by the conveyance roller pair 16.

Therefore, according to this embodiment, in a case that a metal card is processed in the card reader 2, variation of an output of the metal detecting mechanism 10 due to variation of a distance between an external connection terminal 3*b* and the metal detecting mechanism 10 can be suppressed. As a result, in this embodiment, even in a case that a metal card is processed in the card reader 2, deterioration of accuracy for detecting whether a card 3 inserted from the card insertion slot 4 is formed with an external connection terminal 3*b* or not can be suppressed, and deterioration of accuracy for detecting whether a front face of the card 3 formed with an external connection terminal 3*b* faces an upper side or not can be suppressed.

In this embodiment, in a case that a metal card is processed in the card reader 2, it can be detected that a front face of the card 3 formed with an external connection terminal 3*b* faces an upper side based on a detection result of the metal detecting mechanism 11. However, the metal detecting mechanism 11 is disposed on a front side with respect to the pre-head 12 and is disposed at a position near the card insertion slot 4. Therefore, a distance between the metal detecting mechanism 11 and a card 3 may vary due to a hand shake. When a distance between the metal detecting mechanism 11 and a card 3 varies due to a hand shake, an output of the metal detecting mechanism 11 is varied. Therefore, although an external connection terminal 3*b* is not formed on the card 3 or, although a front face of the card 3 faces a lower side, an output of the metal detecting mechanism 11 may vary to erroneously detect presence or absence of the external connection terminal 3*b* of the card 3, and the like.

In this embodiment, the metal detecting mechanism 10 is disposed on a rear side with respect to the shutter member 13, and the metal detecting mechanism 10 is capable of being disposed on a rear side in the card conveyance path 5. Further, in this embodiment, when a rear end of the card 3 is sandwiched between the conveyance roller pair 16, a half or more portion of the card 3 in the front-rear direction is disposed on a rear side with respect to the card insertion slot 4. Therefore, in this embodiment, when an external connection terminal 3*b* passes the position where the metal detecting mechanism 10 is disposed in the front-rear direction, a holding margin of a card 3 by a user can be reduced. As a result, when an external connection terminal 3*b* passes the position where the metal detecting mechanism 10 is disposed in the front-rear direction, a hand shake hardly occurs.

Therefore, according to this embodiment, when an external connection terminal 3*b* passes the position where the metal detecting mechanism 10 is disposed in the front-rear direction, variation of a distance between the external connection terminal 3*b* and the metal detecting mechanism 10 can be effectively suppressed.

In this embodiment, the metal detecting mechanism 11 is disposed on a front side with respect to the shutter member 13. Therefore, in this embodiment, in a case that metal is not detected by the metal detecting mechanism 11, the card 3 can be prevented from being taken into a rear side with respect to the shutter member 13.

Other Embodiments

Although the present invention has been shown and described with reference to a specific embodiment, various changes and modifications will be apparent to those skilled in the art from the teachings herein.

In the embodiment described above, as shown by the two-dot chain line in FIG. 4A, the metal detecting mechanism 10 may be disposed on a rear side with respect to the center "CL2" of the conveyance roller pair 16 in the front-rear direction. Further, in the embodiment described above, the card conveyance mechanism 6 may include only one conveyance roller pair structured to contact with a card 3 and convey the card 3 in a sandwiching state. In this case, when a rear end of the card 3 formed with an external connection terminal 3*b* is sandwiched between the conveyance roller pair, the metal detecting mechanism 10 is disposed on a rear side with respect to the external connection terminal 3*b*. Further, in this case, the one conveyance roller pair is the first conveyance roller pair.

In the embodiment described above, when a rear end of a card 3 is sandwiched between the conveyance roller pair 16, a half or more portion of the card 3 in the front-rear direction may be disposed on a front side with respect to the card insertion slot 4. Further, in the embodiment described above, the card reader 2 may include no metal detecting mechanism 11. In addition, in the embodiment described above, the card reader 2 may include no magnetic head 8 and no pre-head 12.

Technical Structure

Embodiments of the present invention may be structured as follows.

(1) A card reader for processing a card which incorporates an IC chip and is formed with an external connection terminal of the IC chip, the card reader including a card insertion slot into which the card is inserted, a card conveyance path in which the card inserted from the card insertion slot is conveyed, a card conveyance mechanism structured to convey the card along the card conveyance path, and a metal detecting mechanism for detecting the external connection terminal. When one side in a conveying direction of the card by the card conveyance mechanism is referred to as a front side and, when the other side in the conveying direction of the card by the card conveyance mechanism is referred to as a rear side, a front side end of the card conveyance path is formed with the card insertion slot. The card conveyance mechanism includes one or more conveyance roller pairs which contact with the card and convey the card in a sandwiching state. In a case that the card conveyance mechanism includes a plurality of the conveyance roller pairs, when the conveyance roller pair which is disposed on the most front side is referred to as a first conveyance roller pair and, in a case that the card conveyance mechanism includes only one conveyance roller pair, when the one conveyance roller pair is referred to as a first conveyance roller pair, the metal detecting mechanism is disposed on a rear side with respect to the external connection terminal of the card when a rear end of the card is sandwiched between the first conveyance roller pair.

(2) The card reader described in the above-mentioned structure (1), where the metal detecting mechanism is disposed on a front side with respect to a center of the first conveyance roller pair in the conveying direction of the card.

(3) The card reader described in the above-mentioned structure (1) or (2), where when the rear end of the card is sandwiched between the first conveyance roller pair, a half or more portion of the card in the conveying direction of the card is disposed on a rear side with respect to the card insertion slot.

(4) The card reader described in one of the above-mentioned structures (1) through (3), further including a shutter member for closing the card conveyance path and a second metal detecting mechanism disposed on a front side with respect to the shutter member, where the metal detecting mechanism is disposed on a rear side with respect to the shutter member.

In this embodiment, for example, the metal detecting mechanism is disposed on a front side with respect to a center of the first conveyance roller pair in a conveying direction of a card. In this case, various structures for processing the card are easily disposed in an inside of the card reader.

In this embodiment, it is preferable that when a rear end of the card is sandwiched between the first conveyance roller pair, a half or more portion of the card in the conveying direction of the card is disposed on a rear side with respect to the card insertion slot. According to this structure, in the conveying direction of the card, in a state that an external connection terminal passes a position where the metal detecting mechanism is disposed, a holding margin of the card by a user can be reduced. Therefore, a hand shake hardly occurs when the external connection terminal passes the position where the metal detecting mechanism is disposed in the conveying direction of the card. As a result, when the external connection terminal passes the position where the metal detecting mechanism is disposed in the conveying direction of the card, variation of a distance between the external connection terminal and the metal detecting mechanism can be effectively suppressed.

In this embodiment, it is preferable that the card reader further includes a shutter member for closing the card conveyance path and a second metal detecting mechanism disposed on a front side with respect to the shutter member, and the metal detecting mechanism is disposed on a rear side with respect to the shutter member. According to this structure, the metal detecting mechanism can be disposed on a rear side in the card conveyance path and thus, in a state that the external connection terminal passes the position where the metal detecting mechanism is disposed in the conveying direction of the card, a holding margin of the card by a user can be reduced. Therefore, when the external connection terminal passes the position where the metal detecting mechanism is disposed in the conveying direction of the card, a hand shake hardly occurs. As a result, in a state that the external connection terminal passes the position where the metal detecting mechanism is disposed in the conveying direction of the card, variation of a distance between the external connection terminal and the metal detecting mechanism can be effectively suppressed. Further, according to this structure, in a case that metal is not detected by the second metal detecting mechanism, the card can be prevented from being taken into a rear side with respect to the shutter member.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A card reader for processing a card which incorporates an IC chip and is formed with an external connection terminal of the IC chip, the card reader comprising:

a card insertion slot into which the card is inserted;

a card conveyance path in which the card inserted from the card insertion slot is conveyed;

a card conveyance mechanism structured to convey the card along the card conveyance path; and a metal detecting mechanism for detecting the external connection terminal;

wherein when one side in a conveying direction of the card by the card conveyance mechanism is referred to as a front side and, when an other side in the conveying direction of the card by the card conveyance mechanism is referred to as a rear side, a front side end of the card conveyance path is formed with the card insertion slot;

the card conveyance mechanism comprises one or more conveyance roller pairs which contact with the card and convey the card in a sandwiching state;

in a case that the card conveyance mechanism comprises a plurality of a conveyance roller pairs, the conveyance roller pair which is disposed on most front side is referred to as a first conveyance roller pair and, in a case that the card conveyance mechanism comprises only one conveyance roller pair, the one conveyance roller pair is referred to as a first conveyance roller pair; and the metal detecting mechanism is disposed on the front side with respect to a center of the first conveyance roller pair in the conveying direction of the card and is disposed on the rear side with respect to the external connection terminal of the card when a rear end of the card is sandwiched between the first conveyance roller pair; and the external connection terminal of the card is detected by the metal detecting mechanism after the rear end of the card is sandwiched between the first conveyance roller pair and then is passed through the center of the first conveyance roller pair.

2. The card reader according to claim 1, wherein when the rear end of the card is sandwiched between the first conveyance roller pair, a half or more portion of the card in the conveying direction of the card is disposed on the rear side with respect to the card insertion slot.

3. The card reader according to claim 1, further comprising:

a shutter member for closing the card conveyance path; and a second metal detecting mechanism disposed on the front side with respect to the shutter member;

wherein the metal detecting mechanism is disposed on the rear side with respect to the shutter member.

4. A card reader for processing a card which incorporates an IC chip and is formed with an external connection terminal of the IC chip, the card reader comprising:

a card insertion slot into which the card is inserted;

a card conveyance path in which the card inserted from the card insertion slot is conveyed;

a card conveyance mechanism structured to convey the card along the card conveyance path; and a metal detecting mechanism for detecting the external connection terminal;

wherein when one side in a conveying direction of the card by the card conveyance mechanism is referred to as a front side and, when an other side in the conveying direction of the card by the card conveyance mechanism is referred to as a rear side, a front side end of the card conveyance path is formed with the card insertion slot;

the card conveyance mechanism comprises one or more conveyance roller pairs which contact with the card and convey the card in a sandwiching state;

in a case that the card conveyance mechanism comprises a plurality of a conveyance roller pairs, the conveyance roller pair which is disposed on most front side is referred to as a first conveyance roller pair and, in a case that the card conveyance mechanism comprises only one conveyance roller pair, the one conveyance roller pair is referred to as a first conveyance roller pair; and the metal detecting mechanism is disposed on the rear side with respect to the external connection terminal of the card when a rear end of the card is sandwiched between the first conveyance roller pair;

a shutter member for closing the card conveyance path; and a second metal detecting mechanism disposed on the front side with respect to the shutter member; and the metal detecting mechanism is disposed on the rear side with respect to the shutter member.

5. The card reader according to claim 4, wherein when the rear end of the card is sandwiched between the first conveyance roller pair, a half or more portion of the card in the conveying direction of the card is disposed on the rear side with respect to the card insertion slot.

* * * * *